United States Patent [19]

Koehmstedt

[11] 4,455,186
[45] Jun. 19, 1984

[54] SELF-CONTAINED EXOTHERMIC APPLICATOR AND PROCESS

[75] Inventor: Paul L. Koehmstedt, Richland, Wash.

[73] Assignee: Battelle Memorial Institute, Richland, Wash.

[21] Appl. No.: 535,580

[22] Filed: Sep. 26, 1983

Related U.S. Application Data

[63] Continuation-in-part of Ser. No. 489,006, Apr. 27, 1983, abandoned, which is a continuation-in-part of Ser. No. 929,120, Jul. 28, 1978, abandoned.

[51] Int. Cl.$^3$ ............................................. B32B 31/00
[52] U.S. Cl. .................................. 156/273.9; 114/227; 156/91; 156/94; 156/155; 156/275.5; 156/275.7; 156/286; 156/295; 156/305; 156/307.7; 156/309.6; 156/322; 156/379.6; 156/379.7; 156/379.8; 156/382; 156/499; 428/63
[58] Field of Search .................... 86/1 R; 102/202.5; 114/227; 126/263; 149/19.1, 19.8, 19.9, 51, 52, 60, 108.6; 156/91, 94, 155, 273.9, 275.5, 275.7, 286, 295, 305, 307.7, 309.6, 322, 379.6, 379.7, 379.8, 382, 499; 428/58, 63, 223

[56] References Cited

U.S. PATENT DOCUMENTS

| | | |
|---|---|---|
| 1,252,909 | 1/1918 | Low . |
| 2,633,455 | 3/1953 | Finkelstein et al. . |
| 2,824,821 | 2/1958 | Nischk et al. ........................ 156/332 |
| 2,847,395 | 8/1958 | Wear ..................................... 156/330 |
| 2,849,300 | 8/1958 | Berman . |
| 3,043,342 | 7/1962 | Graham ................................ 138/99 |
| 3,051,509 | 8/1962 | Wilton et al. ........................ 285/21 |
| 3,370,565 | 2/1968 | Takezawa et al. ..................... 114/77 |
| 3,370,998 | 2/1968 | Wiswell ................................ 156/330 |
| 3,419,448 | 12/1968 | Dickinson ............................ 156/94 |
| 3,451,696 | 6/1969 | Hagelin et al. ....................... 285/21 |
| 3,642,553 | 2/1972 | Georges ............................ 156/331.4 |
| 3,827,359 | 8/1974 | Daughienbaugh ................. 102/1 R |
| 4,001,152 | 1/1977 | Leonhardt ............................ 156/82 |
| 4,004,523 | 1/1977 | Clifford et al. ..................... 102/103 |
| 4,026,976 | 5/1977 | Anderson ............................ 264/36 |
| 4,067,759 | 1/1978 | Vrolyk et al. ....................... 156/94 |
| 4,070,225 | 1/1978 | Batdork .............................. 156/330 |
| 4,257,990 | 3/1981 | Thomas et al. ..................... 264/36 |

Primary Examiner—Robert A. Dawson
Attorney, Agent, or Firm—Klarquist, Sparkman, Campbell, Leigh & Whinston

[57] ABSTRACT

An adhesive resin application system which requires no external heating apparatus, and which is operative in the absence of a reactive atmosphere, is disclosed. The system provides its own heat by employing an adhesive material containing reactants which react exothermally when electrically ignited. After ignition of the reactants, sufficient heat energy is liberated by the exothermic reaction either to plasticize a thermoplastic resin or to cure a thermosetting resin and therby bond together two closely spaced objects.

29 Claims, 9 Drawing Figures

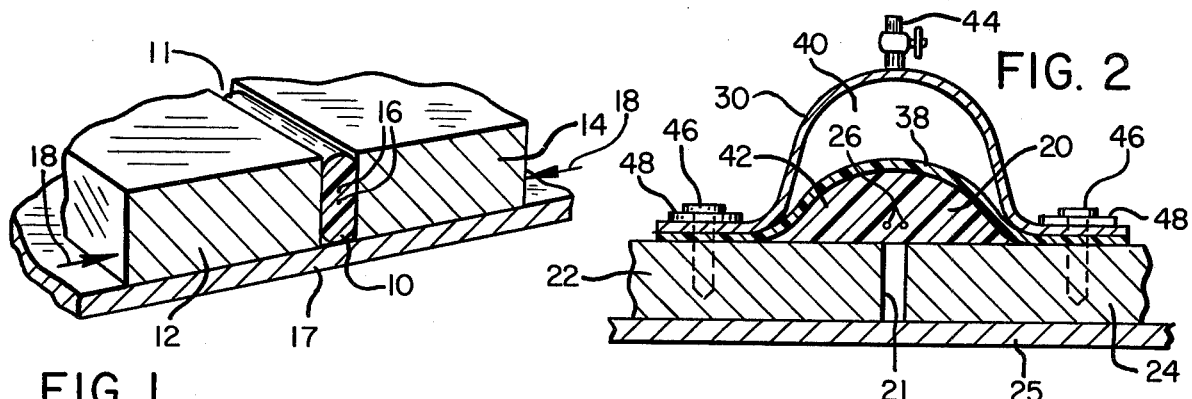
FIG. 1
FIG. 2
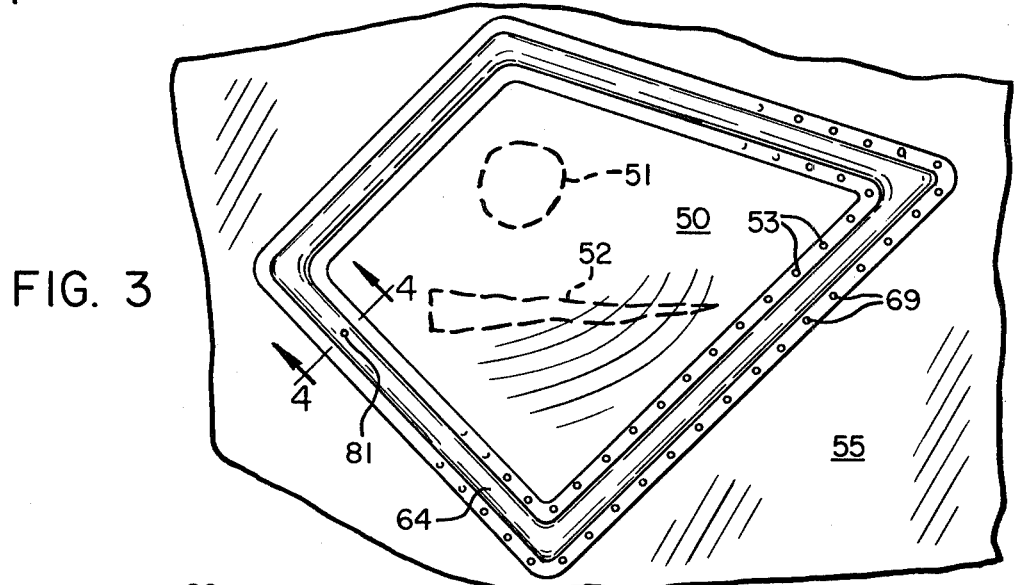
FIG. 3
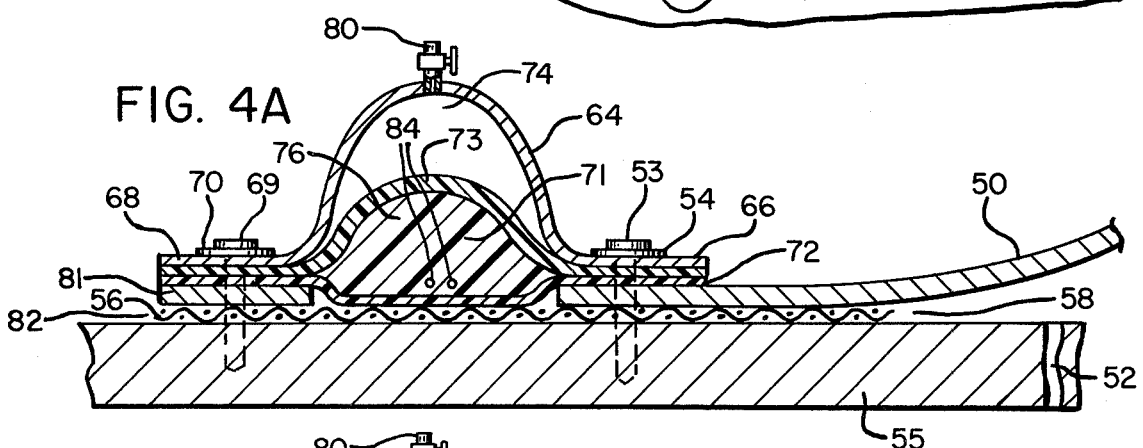
FIG. 4A
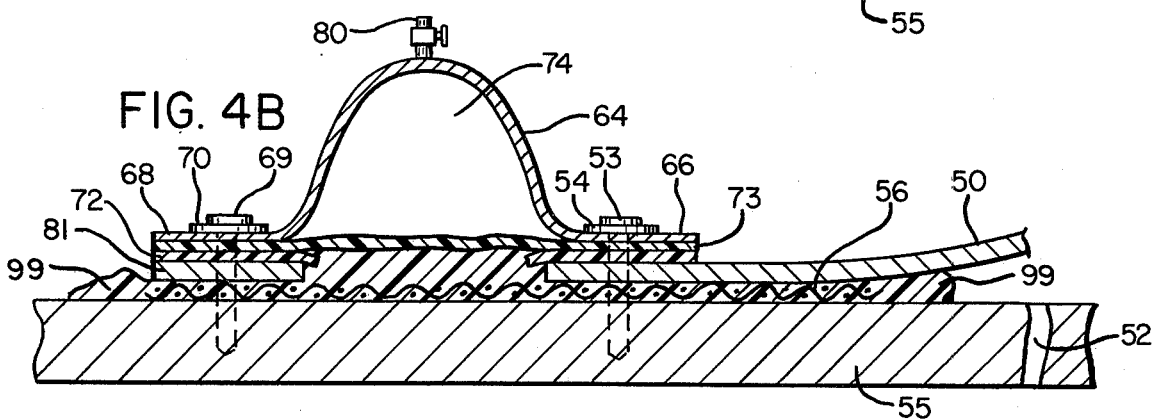
FIG. 4B

4,455,186

SELF-CONTAINED EXOTHERMIC APPLICATOR AND PROCESS

This application is a continuation-in-part of application Ser. No. 489,006, filed Apr. 27, 1983, which is a continuation-in-part of application, Ser. No. 929,120, filed July 28, 1978, both now abandoned.

INTRODUCTION

This invention is directed to a method and system for adhesively joining members utilizing an exothermic adhesive which is operative in the absence of an oxidizing atmosphere.

BACKGROUND OF THE INVENTION

The present invention relates to the adhesive bonding of structural members and more specifically to a self-contained exothermic adhesive bonding system for applying thermoplastic or thermosetting resins.

Numerous existing bonding processes involve the application of either thermosetting or thermoplastic resins. Because such adhesive resins require heat energy to acquire their desired adhesive properties, it has heretofore been necessary to provide a separate external heating apparatus to melt a thermoplastic resin prior to application or to cure a thermosetting resin after application as a liquid. The need for a separate heating apparatus has reduced the convenience of such adhesives. In some cases it has even prevented their use in remote locations, such as under water or in a vacuum as exists in outer space.

To avoid this problem, U.S. Pat. No. 3,827,359 of Daughenbaugh, issued Aug. 6, 1974, proposes to provide a chemical substance which reacts with water to produce the heat energy needed to melt a thermoplastic resin. A mass of the resin is shaped to define a cavity which is partially filled with the reactive chemical substance. After the mass is placed against the hull of a ship, water is admitted into the cavity to react with the chemical substance, thereby producing heat to melt the mass. While this may be sufficient for attaching an explosive charge to a ship's hull, it would not provide a strong bond because the heat of the reaction could not be distributed evenly in such a system. Also, according to Daughenbaugh, a warmed resin is applied directly to a cold surface. Resin applied in this manner cools too rapidly to form an airtight bond. Daughenbaugh's system is further disadvantageous because it cannot be used in the absence of a water source.

H. H. Leonard, U.S. Pat. No. 4,001,152 discloses a mixture of a thermoplastic adhesive and a fuel in the form of a stick. The end is ignited, causing the adhesive to melt and drip onto a surface. The fuel is said to continue to burn, keeping the adhesive tacky for the application of an object to be joined to the surface. This can be used only in an atmosphere, such as air, which supports combustion.

SUMMARY OF THE INVENTION

It has now been discovered that adhesive materials for bonding structural members together may include reactants which are stable under most conditions but which react exothermally in the absence of a reactive atmosphere if ignited. When combined in the proper ratio, these reactants will react to release heat energy sufficient to impart the desired adhesive properties to the adhesive material, but will not react to the extent of totally consuming the material. Hot gasses given off during the reaction flow over and warm the surfaces to be joined so that a strong adhesive bond is formed as the material cools or cures.

Therefore, one object of this invention is to provide an improved self-contained exothermic adhesive joining system and process.

It is a further object of this invention to provide such an adhesive system employing exothermally reactive thermoplastic or thermosetting resins for sealing structural members.

Another object is to provide such an adhesive system which can force flowable resins into inaccessible areas for sealing the same.

A further object is to provide a self-contained sealing system which can be used in remote locations, under water or in a vacuum.

Yet another object is to provide a self-contained exothermic adhesive applicator including ignition means and exothermic reactants for heating both an adhesive material and the objects to be joined together.

A specific object of the invention is to provide a sealing system for applying patches to ship hull plating or to pipelines under water.

The above and other objects and advantages of the invention can best be understood from the following detailed description.

BRIEF DESCRIPTION OF THE DRAWINGS

In the drawings:

FIG. 1 is an isometric vertical section view of an adhesive joining system according to one embodiment of the present invention prior to the heating of the adhesive material;

FIG. 2 is a vertical section view showing a second embodiment of an adhesive joining system of the type shown in FIG. 1;

FIG. 3 is a plan view of a hull patch employing a third embodiment of the adhesive joining system of the present invention;

FIG. 4A is a partial vertical section view taken along line 4—4 of FIG. 3 showing the adhesive joining system prior to the heating of the adhesive material;

FIG. 4B is a partial vertical section view taken along line 4—4 of FIG. 3 showing the adhesive joining system after the heating of the adhesive material;

DESCRIPTION OF THE PREFERRED EMBODIMENTS

Figure 5:
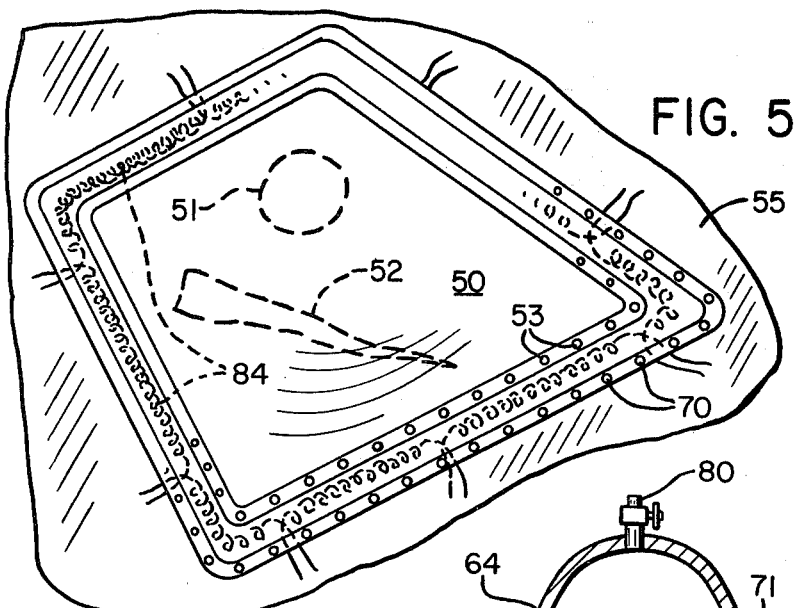
FIG. 5 is a schematic view of the hull patch shown in FIG. 3 including multiple resistance ignitors.

The present invention is shown in an elementary form in FIG. 1. In this embodiment a mass of adhesive material 10 is positioned in a space 11 between two objects 12, 14 which are to be bonded together. An electrical ignitor, including two spaced wires 16, is embedded in the adhesive to heat the adhesive material. A reaction involving a reactant material in the mass is initiated by connecting the ignitor wires 16 across a voltage source. Ignitor wires of high electrical resistance are advantageous ignitor means because they can be employed as a heat source under a wide variety of conditions.

The embodiment of FIG. 1 includes a base support 17 to maintain the adhesive material in the space 11 while that adhesive material is in a liquid phase. If necessary, a thin layer of non-reactive material may be inserted between the objects 12, 14 and the base support 17 to prevent the adhesive from bonding thereto. This embodiment may optionally have a positioning means (not shown) which pushes the objects in the direction of arrows 18. The width of the space 11 is thereby reduced to compensate for the reduction in volume which results from the partial consumption of material during heating. Other embodiments may have distribution means whereby a liquid adhesive material is pushed from an external reservoir into the space between the adherents.

An adhesive material suitable for use according to this invention includes one or more adhesive resin components along with reactants which, when ignited, react exothermally to provide an amount of heat sufficient to induce the resin components to form a bond. A suitable material could, for example, include a combination of reducing and oxidizing moieties which combination will "burn" even in a non-oxidizing atmosphere or a substantial vacuum or when completely enclosed by, e.g., a housing. Adhesive materials containing such reactants are similar to solid fuel rocket propellant charges except that they contain a substantial mass of the adhesive material which remains to bond the adherents after the exothermic reaction is complete.

There are at least two ways to formulate such propellant-type adhesive materials so that an adhesive residue remains to bond the adherents together after the exothermal reaction is terminated.

According to one method, one of the reactants comprises a resinous adhesive component of the material and the ratio of reactants is selected so that the reactant which comprises an adhesive component is not totally consumed during the exothermic reaction. This is accomplished by including a less than stoichiometric amount of an essentially non-adhesive reactant. When a material formulated according to this method is ignited in a substantially non-reactive atmosphere, combustion will be incomplete so that a portion of the adhesive component reactant remains as an adhesive residue after the burn. Formulations of this type can, for example, include a thermoplastic adhesive reducing agent and a less than stoichiometric amount of an oxidizing agent. Selection of the reducing agent is based on the adherency of the polymeric residue it leaves after a controlled incomplete combustion.

Various known polymeric resins such as polybutadienes, polyacrylates, etc., may serve as the adhesive reducing agent. Ammonium perchlorate is my preferred oxidizing agent but others; such as nitrite-free ammonium nitrate may be used if preferred. The amount of oxidizing agent must be sufficiently less than stoichiometric to leave an unconsumed adhesive residue of the resin. The stoichiometric ratio for complete oxidation of these polymers is about six parts $NH_4ClO_4$ to one part resin, by weight, based on the reaction $4CH_2 + 3NH_4ClO_4 \rightarrow 3NH_4Cl \uparrow + 4CO_2 + 4H_2O$. A typical composition is, by weight percent:

31.0 Butadiene - acrylic acid - acrylonitrile terpolymer
2.5 Dodecylsuccinic anhydride
6.5 Diepoxide resin (reaction product of bisphenol and epichlorhydrin)
12.5 Aluminum powder (14–21$\mu$ average particle size)
47.0 Ammonium perchlorate (−40+200 mesh)
0.5 Ferric oxide The mixture is cured in a mold for about a week at a temperature of 55°–60° C.

According to another suitable formulation method, the adhesive material may contain a relatively unreactive additive along with the exothermic reactants. Such formulations are especially advantageous when the additive is a resinous adhesive substance. When such an additive is used, the reactants may be present in a stoichiometric ratio, so that they are entirely converted to gases during the exothermic reaction. When the reaction is complete, only the heated adhesive additive remains. The additive subsequently cools and forms the adhesive residue which joins the adherents together. Formulations of this type typically include a combination of highly reactive oxidizing and reducing moieties along with a large amount of substantially non-reactive thermoplastic adhesive additive. These moieties may either be separate compounds or parts of compounds. In the double-base propellants which constitute part of my presently preferred embodiments, the nitrate groups are the oxidizing moiety while the carbon and hydrogen-containing groups are the reducing moiety—the principal reaction products being $CO_2$, $H_2O$, $N_2$, and $N_2O$. Preferably, the additional adhesive is present as a phase physically distinct from the reactant. For example, the additive may be in the form of fairly large spheres or cylinders surrounded by the reactant mixture, or it may be in the form of a plurality of beads embedded in a reactant matrix.

It is desirable that the reactant mixture be one which generates gas on reacting, so that, if the joining operations are carried out under water, water will be forced out of the joints. It is also desirable that the reactant mixture be substantially free of non-combustible inorganic constituents, such as chloride salts or ash-forming constituents. Such materials have been found to prevent proper adhesion.

Particularly for underwater use, I have found a "double-base propellant" to be a desirable reactant mixture. A double-base propellant is one containing a nitrate ester of a polyhydric alcohol such as glyceryl nitrate (nitroglycerine) plus a nitrocellulose of the proper degree of nitration to produce the reaction speed desired. The degree of nitration of nitrocellulose is generally defined by the percentage nitrogen in the composition. I have found one containing about 12.5 percent nitrogen to be desirable. I have employed nitroglycerine and triethyleneglycol dinitrate as nitrate esters. The composition may contain other organic compounds as modifiers and very small amounts of inorganic compounds. The latter, however, should be in sufficiently small proportions that they do not adversely affect the adhesive properties after combustion. The following experimental examples show the behavior of certain mixtures of these types.

EXPERIMENTAL EXAMPLES

Tests were performed using an assembly corresponding to FIG. 1 of the drawing. Springs were arranged to force the members 12 and 14 toward each other as indicated by arrows 18. Test specimens for members 12 and 14 were in the form of concrete cubes about 3 inches on a side and steel plates about 4 inches square and ¼ inch thick. Various experiments involved bonding concrete to concrete, steel to steel, and steel to concrete, all under water.

EXAMPLE 1 THERMOPLASTIC ADHESIVE

The successful thermoplastic adhesive was a polyamide "hot glue" in the form of sticks intended for use in a "hot glue gun". They had diameters of about 1.15 cm and lengths of about 5 cm with estimated weights of about 4.6 g. They were soft at about 150° C. Three of these sticks were arranged vertically between each pair of test specimens, spaced apart and spaced from the edges by about equal distances. Pieces of the reactant material were packed around and between the sticks of adhesive.

The reactant material had the following composition by weight:

| | |
|---|---|
| nitrocellulose (12.6% N) | 50% |
| triethyleneglycol dinitrate | 33% |
| dimethyl sebacate | 10% |
| 2-nitrodiphenylamine | 2% |
| lead stearate | 2% |
| carbon black | 0.2% | about 85 g of the mixture was used when joining steel-to-steel and about 56 g for steel-to-concrete and concrete-to-concrete.

Ignition was by means of an electric squib adjacent in which was placed about one gram of an equimolar mixture of boron and $KNO_3$. Between this and the main reactant mixture was a sheet of starter mixture of the following composition:

| | |
|---|---|
| nitrocellulose (12.6% N) | 49% |
| nitroglycerine | 35% |
| dimethyl sebacate | 30% |
| 2-dinitrodiphenylamine | 2% |
| lead stearate | 0.2% |

This serves not only to ignite the main reactant mixture but to generate copious quantities of hot gas to drive out water and dry the surfaces to be joined.

In each test the assembly was placed in water, about two feet below the surface and the squib fired. In each case a satisfactory bond was formed when the above compositions were used.

Experiments were also carried out using the following reactant mixtures:

| | |
|---|---|
| nitrocellulose (12.6% N) | 49% |
| nitroglycerine | 40% |
| di-n-propyl adipate | 33% |
| 2-nitrodiphenylamine | 2% |
| lead beta resorcinate | 2.5% |
| monobasic cupric salicylate | 2.5% |
| candelera wax | 0.1% |

This burned too rapidly and failed to completely melt the sticks of adhesive. They had partially melted at, and inwardly from, their surfaces. It appears that beads of adhesive dispersed in a matrix of this mixture would probably perform very satisfactorily and would be advantageous when a particularly fast-acting system was desired.

EXAMPLE 2 THERMOSETTING ADHESIVE

EPDM (ethylene-propylene-diene monomer) containing tertiary butyl perbenzoate as a catalyst was received as a highly viscous liquid. A gob of this material was placed on a steel plate and surrounded by pieces of the reactant material successfully used in Example 1, together with the squib, $B-KNO_3$ igniter and the starting composition used in Example 1. Another steel plate was placed over this assembly and the springs applied to force them together. The EPDM conformed to the thickness of the reactant pieces. The combination was immersed two feet beneath the surface of the water and the squib fired.

The EPDM polymerized to a form similar to the tread rubber of a tire and was tightly bonded to both steel plates.

Various other methods of formulation will be apparent, including combinations and variations of the above-mentioned methods. In such combinations the adhesive residue may include both thermoplastic additives and unreacted reducing agents. Iron powder, aluminum powder or similar heat transfer agents may be added to adhesive materials of any formulation to increase the temperature and flame propagation rates for more uniform heating of the adhesive.

As previously mentioned, it may be necessary to conduct the exothermic reaction of the adhesive material in a nonreactive atmosphere. This may be accomplished by substantially encapsulating the reaction in an applicator device of the type shown in FIG. 2 wherein a body (bead) of exothermally reactive adhesive material 20 is positioned above a space 21 between objects 22 and 24 which rest on a base support 25. Ignitor wires 26 are embedded in the bead and are adapted for connection across a source of electric power. The adhesive material 20 is covered by a cover 30 defining a fluid containment channel, the interior of which is divided by a pliant airtight heat insulating wall 38, into an upper or fluid-containing portion 40 and a lower or adhesive-containing portion 42. The upper portion 40 is connected to a fluid inlet 44. This inlet may incorporate a pressure relief valve so that pressure inside the chamber does not exceed a certain specified amount. The cover 30 and the pliant wall 38 together serve as a pressure distribution means which is adapted to urge the adhesive material into the space 21 while the adhesive material is in a liquid phase.

The adhesive 20, wall 38 and cover 30 together comprise an assembled unit which is attached to the objects 22 and 24 by attachment studs 46 and washers 48. Once the unit is attached with the adhesive material 20 located above the space 21, air or some other pressurizing fluid is pumped into the upper portion 40 through the inlet 44 until the pressure inside the portion 40 is greater than the pressure inside the space 21. As the pressure increases the wall 38 moves downward pushing the adhesive material 20 into direct contact with the objects 22, 24.

Once the unit is attached and the upper portion 40 pressurized, the adhesive material is ignited. Heat released by the subsequent exothermic reaction causes the unreacting thermoplastic adhesive components of the mixture to melt. As they melt, pressure inside the portion 40 causes the wall 38 to further collapse pushing molten thermoplastic adhesive components into the space 21. The exothermic reaction continues until a limiting reactant is entirely consumed. Thereafter, the remaining components of the adhesive material cool forming a solid adhesive residue which bonds together the objects 22 and 24.

To insure that the reaction is conducted in a nonreactive atmosphere, the wall 38 is constructed of a material impervious to reactive substances which may be present in the fluid-containing portion 40. For example, if air is the pressurizing fluid in the portion 40 and if the adhesive material 20 includes a reactive reducing agent as one of its adhesive components and also includes an oxidizing agent which serves as a limiting reactant, the wall 38 should be made from material which is substantially impervious to oxygen. This prevents oxygen in the air from migrating to the adhesive material 20 where it could react and consume that portion of the reactive reducing agent which is to serve as an adhesive component.

The presence of atmospheric pressure oxidizing gases in the space 21 is not a problem since hot gases, including $N_2$, $H_2$, CO, $CO_2$ and $H_2O$, are produced during the exothermic reaction. These hot gases are rapidly expelled downward through the space 21 so that atmospheric gases are driven out of the space 21 and are thus prevented from affecting the reaction. As they pass through the space 21 the hot gases preheat the adherent objects and thus promote the strength of the bond formed between the adhesive residue and the objects.

The applicator device shown in FIG. 2 may be used in high pressure environments such as under water, or in low pressure environments such as outer space regions. With a small amount of experimentation, a person skilled in the art can ascertain the optimum pressure differential between the portion 40 and the space 21 so that proper adhesive distribution can be achieved in any environment.

Because hot gases produced during the exothermic reaction will drive water out of the space 21, and simultaneously heat the surfaces to be joined, this self-contained applicator device is especially well suited for repairing damage beneath the water line of a ship hull. It may also be used to seal holes in a sunken vessel and thereby permit salvage of the vessel by displacing water in the hull with air.

A patch suitable for sealing ship hulls is shown in FIGS. 3, 4A and 4B. This patch includes a sheet of patching material 50 which is of sufficient size to cover the hull openings 51 and 52 to be sealed. Studs 53 and washers 54 serve as positioning means for securing this sheet 50 to the hull plating 55. In some cases, electromagnets or other holding means may replace studs 53. Spacer 56, such as a sheet of hardware cloth, is provided to keep the sheet of patching material 50 and the hull plate 55 sufficiently separated so that a space 58 remains between the plates 50 and 55. Hardware cloth is a preferred spacer means because it not only provides the needed separation between members, but it also adds structural reinforcement to the adhesive material after it has set.

A containment jacket or cover 64 extends around the perimeter of the sheet 50 to provide an annular channel-shaped containment chamber for an exothermic reaction. This jacket 64 has an inwardly extending flange 66 mounted on a sheet 50 and an opposed outwardly extending flange 68 which is to be secured to the hull plate 55 with studs 69 and washers 70. For ease of installation in an underwater environment, explosively driven studs are preferred.

A bead 71 of exothermally reactive adhesive material is disposed inside the annular channel of the jacket 64 around the entire perimeter of the sheet 50. The bead is retained in position between a lower retaining layer 72 of a thermoplastic adhesive material and an upper pliant wall 73. The wall divides the chamber defined by the jacket 64 into an upper fluid-receiving portion 74 and a lower adhesive-containing portion 76. An inlet 80 is provided in the jacket to introduce pressurized fluid into the portion 74.

A pre-pressurized, sealed unit can be constructed by sealing the jacket 64, retaining layer 72 and wall 73 to each other along the edges where they touch. Providing that the retaining layer 72 is of sufficient strength, the fluid-receiving portion 74 of the sealed unit can be charged through inlet 80 to the desired pressure prior to the unit's installation on the plate 55. This eliminates the need for transporting a pump apparatus to the installation site.

To add further strength to the unit, a ring-shaped metal rim member 81 may extend around the outer perimeter of the jacket 64 under the retaining layer 72 opposite the flange 68. This rim member 81 is held in position between the outwardly extending flange 58 and the hull plate 55 by the studs 69. The hardware cloth spacer 56 may be extended to the outer edge of the rim 81 and thus provide an adhesive sealing space 82 between the rim 81 and the hull plating 55. Ignitor wires 84 or other suitable ignition devices are implanted in bead 71 before the other components of the unit are sealed together. As illustrated in FIG. 5, the ignition device can conveniently comprise a plurality of resistance wires 84 implanted end-to-end through the bead 71. These can be electrically connected to a voltage source in parallel so that all portions of the bead will be ignited nearly simultaneously.

Once the bead is ignited at any point, temperatures in the region of ignition will rise rapidly causing adjacent portions of the resistance wire to melt, thus opening the electrical circuit and ceasing ignition heat in other regions along the wire. Because multiple resistance wires are used around the patch, early ignition at one location will not break the circuits of resistance wires at other locations. To minimize the number of electrical connections that need to be made by a person installing the patch, however, the number of resistance wires used should be limited to the minimum necessary to insure proper ignition.

The resistance wires should be made of material which is not corroded by the constituents of the adhesive bead, either during molding or extended storage in high humidity conditions. By locating the wires near the retaining layer 72 as shown in FIG. 4A, substantially all reaction gases will escape through spaces 58, 82 so that no auxiliary ventilation ports will be required.

Figure 6:
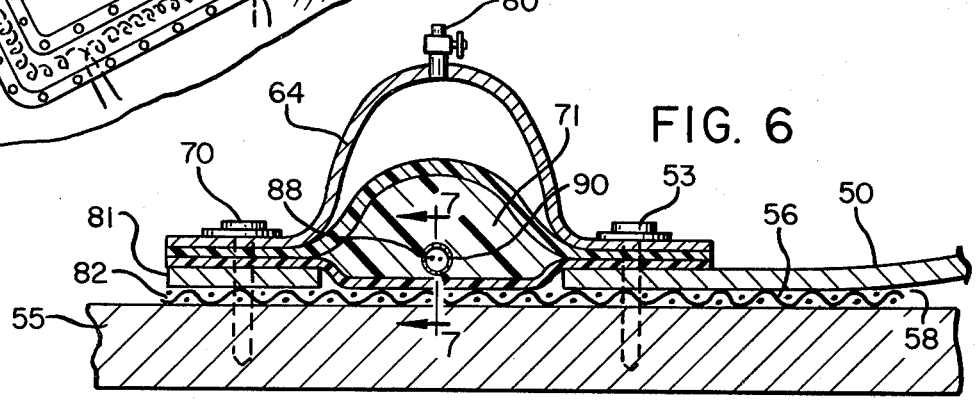
FIG. 6 is a partial vertical section view showing the adhesive joining system of FIG. 3 including a cartridge ignitor.
Figure 7:
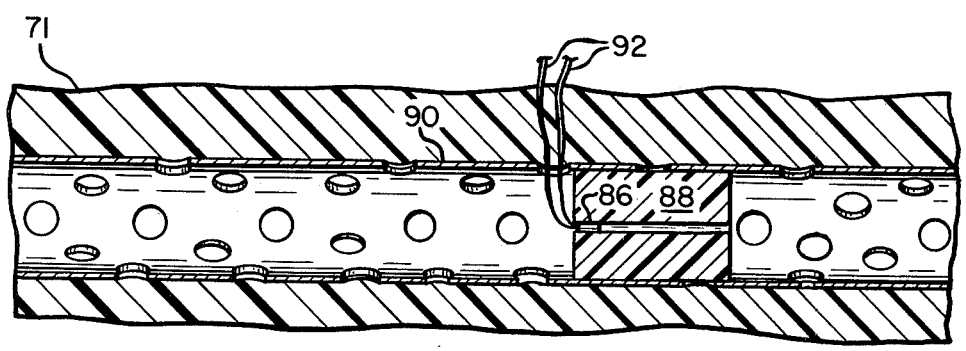
FIG. 7 is an enlarged partial vertical section view taken along line 7—7 of FIG. 6.
Figure 8:
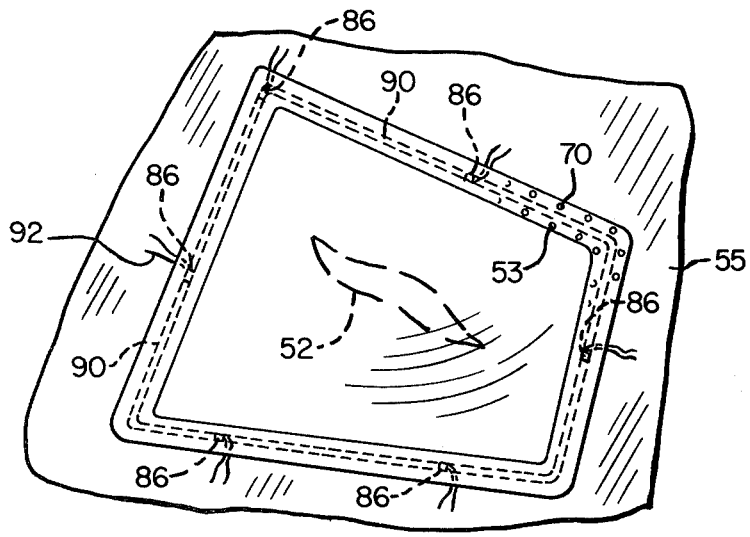
FIG. 8 is a schematic view of the hull patch shown in FIG. 3 including multiple cartridge ignitors.

An alternative ignition device is shown in FIGS. 6 and 8. This device is an elongated cartridge ignitor in which an electrically ignitable primer 86, which may be, for example, mercury fulminate or the mixture of boron and potassium nitrate employed in the Experimental Examples, surrounded by a rapid burning propellant 88 contained in a perforated tube 90. The propellant 88 may be of the nitrocellulose-nitroglycerine type utilized as the starter in the Experimental Examples. The bead 71 is molded around the tube 90 which is made of a material, such as polyethylene, that will melt after ignition occurs and combine with the material of the bead 71 to form an adhesive residue. Electrically conductive primer wires 92 extend from the primers 86 to a location remote from the patch.

The primer wires 92 are connected in parallel to provide full energy to each primer 86. To ignite the cartridge, a voltage is applied to the primer wires 92. This detonates the primers 86 which ignite the propellant 88. Hot gases given off by the burning propellant 88 spread through the tube 90 and contact the bead 71 via the tube's perforations. Contact with the hot gases causes reactants in the bead to ignite so that the above-described bonding process is initiated.

The retaining layer 72 may also be of the same materials as propellant 88. Since the ignitor device will normally be close to layer 72, the latter will be promptly ignited and will burn rapidly, expelling water from spaces 58, 82 heating the surfaces of members 50 and 55 and helping to spread the ignition of the reactants in bead 71.

Cartridge ignitors of the above type are relatively fast acting. Burn time of the primers 86 is about 0.2 seconds. And, the propellant 88 burns completely in about five seconds so that ignition of the bead 71 along the entire length of the tube 90 is substantially simultaneous.

OPERATION

A patch, such as the patch of FIG. 3 or FIG. 8, is first positioned over the holes in a hull to be sealed and the studs 53, 69 driven home. Unless the chamber 74 is prepressurized, fluid is next pumped through the inlet 80 into the chamber 74. After pressurization, the adhesive material is ignited by applying voltage to the ignition device. As the exothermic reaction proceeds, hot gases flush water out of the spaces 58 and 82 and heat the adjacent members including the sheet 50, the hull plate 55, the spacer 56 and the rim member 81.

The bead 71 is heated during the reaction so that the adhesive components of the material melt and are forced by pressure inside the fluid-containing portion 74 to flow into the spaces 58, 82. When the adhesive components subsequently cool, a watertight seal of solid adhesive residue 99 is formed between the sheet 50 and the hull plate 55 around the entire perimeter of the patch. FIG. 4B shows the patch after the reaction is complete and the adhesive residue is formed.

Although the foregoing discussion describes adhesive materials containing thermoplastic adhesive components, it is also possible to formulate suitable materials containing thermosetting adhesive components. Such materials are usually fluid, but become solid upon heating. Because of these properties, adhesive materials containing thermosetting adhesive components must be handled differently from materials containing thermoplastic adhesive components. The main difference is that the material must be positioned between the adherents prior to ignition because once it is heated for an appreciable time, a thermosetting resin is no longer fluid.

When using a system of the type shown in FIG. 1, no changes need to be made to accomodate a fluid adhesive material containing a thermosetting adhesive component. It is only necessary to provide sufficient containment means to keep the material in the space 11 between the objects 12, 14.

Fluid thermosetting adhesive materials can be used in the applicator device shown in FIGS. 4A and 6 so long as the retaining layer 72 lacks sufficient strength to contain the mixture when pressure is applied in the chamber. After such a patch is positioned over the holes to be covered and is secured to the hull plate 55, pressurized fluid is pumped into the chamber 74. Pressure exerted on the wall 73 forces the fluid material to break through the layer 72 and to flow into the spaces 58, 82. The layer 72 may alternatively be a reactant material, e.g., a mixture of cellulose nitrate and nitroglycerine. When the reaction is initiated, the layer 72 will quickly decompose, producing hot gas which assists in driving water out of spaces 58 and 82. Disintegration of the layer permits the thermosetting adhesive to be forced into those spaces before it has solidified. After the spaces are filled with the fluid material, the exothermic reaction is initiated to produce heat for curing the thermosetting component.

It is possible to devise more easily handled, nonfluid mixtures containing thermosetting adhesive components. This is accomplished by adding, to a blend of solid reactants, a plurality of small thermoplastic capsules each of which contains one or more of the constituents of the thermosetting adhesive components. A suitable nonfluid thermosetting adhesive material could, for example, include multiple small thermoplastic spheres, some of which are filled with urea and others of which are filled with formaldehyde. This material could be handled as a solid adhesive material and thus directly placed and easily retained between the adherents prior to ignition.

While I have shown and described preferred embodiments of my invention, it will be apparent to those skilled in the art that many changes may be made without departing from the spirit of the invention. For example, chemical, mechanical and other electric ignitors may be used to initiate the exothermic reaction. Therefore, the scope of the present invention should only be determined by the following claims.

I claim:

1. A process for joining together two objects in the substantial absence of a reactive atmosphere comprising:

in the substantial absence of a reactive atmosphere, conducting an exothermic reaction within an adhesive mass by subjecting said mass to activation energy, said mass comprising at least one reactant which reacts in the absence of a reactive atmosphere to produce heat when subjected to sufficient said activation energy and an adhesive material which acquires adhesive characteristics when heated and which is flowable between said objects during said reaction;

said reaction being conducted in such a manner that there is less than total gasification of said mass and sufficient heat is delivered to said adhesive material to give it said adhesive characteristics and that adhesive material flows between and in contact with said objects;

allowing said adhesive to cool between and in contact with said objects.

2. A process as defined in claim 1 wherein the adhesive is a thermo-plastic adhesive which is originally solid and which is melted by the heat of reaction and flows between and in contact with said two objects.

3. A process as defined in claim 1 in which said adhesive material is a thermosetting adhesive which is originally sufficiently fluid to flow between and in contact with said two objects and which is solidified by said heat.

4. A process as defined in claim 1 wherein the adhesive material is present in the adhesive mass as a phase that is physically distinct from the reactant material.

5. A process as defined in claim 2 wherein the adhesive material is present in the adhesive mass as a phase that is physically distinct from the reactant material.

6. A process as defined in claim 3 wherein the adhesive material is present in the adhesive mass as a phase that is physically distinct from the reactant material.

7. A process as defined in claim 2 wherein said adhesive material and said reactant material are in the form of discrete pieces of solid material.

8. A process as defined in claim 2 wherein said reactant material constitutes a substantially continuous matrix and said adhesive material is in the form of beads imbedded in said matrix.

9. A process as defined in claim 3 wherein said adhesive is originally in the form of a viscous mass and said reactant material is in the form of solid pieces in contact with said viscous mass.

10. A process as defined in claim 1 wherein said reactant material is a mixture of nitrocellulose and a nitrate ester of a polyhydric alcohol.

11. A process as defined in claim 2 wherein said adhesive material is a polyamide.

12. A process as defined in claim 3 wherein said adhesive material is originally ethylene-propylene-diene monomer.

13. A process as defined in claim 1 wherein said reactant material includes an oxidizing moiety and a reducing moiety.

14. A process as defined in claim 1 comprising imparting activation energy to said reactant material by an ignitor embedded in said material.

15. A process as defined in claim 14 wherein said ignitor comprises an electric heating element and a starter mixture which is activated by the heat of said electric heating element.

16. A system for joining together in a substantially nonoxidizing atmosphere two objects positioned a small distance apart so that a narrow space is provided therebetween, comprising:
an adhesive mass comprising an admixture including an adhesive resin material and a nonadhesive reactant material.
said reactant material comprising an oxidizing moiety and a reducing moiety, which moieties react together exothermally when the mixture is supplied with sufficient activation energy, said adhesive material acquiring adhesive characteristics when heated;
means for providing said adhesive mass in said space while said adhesive mass is flowable;
ignitor means for supplying sufficient activation energy to said reactant material to initiate an exothermic reaction therein to heat said adhesive resin material; and means for supporting said ignitor means at a location where said ignitor means can supply said activation energy to said reactant material;
said adhesive material and said reactant material being present in such proportions that said adhesive resin material is heated sufficiently to give it adhesive properties but is not totally destroyed.

17. A system as defined in claim 16 wherein said adhesive resin material is thermoplastic, is originally solid, and is melted by the heat of reaction and flows between and in contact with said two objects.

18. A system as defined in claim 16 wherein said adhesive resin material is thermosetting, is originally sufficiently fluid to flow between and in contact with said two objects.
and is solidified by the heat of reaction of said reactant material.

19. A system as defined in claim 16 wherein said ignitor comprises an electrically heated element.

20. A system as defined in claim 16 wherein:
said mass is initially located outside said space; and said means for providing said adhesive mass comprises compression means for exerting pressure on said mass so that when said mass is flowable an unconsumed portion of said mass flows into said space between said objects.

21. A system as defined in claim 16 wherein said ignitor comprises:
a perforated gas distribution tube embedded in said mass;
an electrically ignitable propellant charge contained within said tube, said charge being selected from those materials which burn rapidly to hot gases when ignited; and
electrically conductive wires extending from said charge to a location outside said mass connectable to an external source of electrical potential to ignite said charge, whereby hot gases spread through said tube and contact said mass via perforations in said tube to initiate said exothermic reaction;

22. A system for patching a hole through a member comprising:
a patch structure including a sheet of patch material of sufficient area to cover the hole and a fluid-containment jacket mounted on said sheet in such a manner as to extend around the perimeter of the sheet, that has an outwardly extending flange and that defines a chamber;
positioning means for positioning said patch structure in fixed relation to said member;
spacer means for maintaining a narrow space between said member and said patch structure while said structure is held in position by said positioning means;
a bead disposed around the perimeter of said sheet, said bead comprising an adhesive thermoplastic resin material and at least one reactant material in intimate contact with said adhesive thermoplastic resin material, said reactant material being so constituted and so distributed that when ignited, it reacts exothermally in such a manner that at least a portion of said resin material melts to form an adhesive residue;
a wall dividing said chamber into a fluid-containing portion and an adhesive-containing portion which contains said bead and is in communication with said space, said jacket including an inlet for admitting a flow of fluid from a pressurized source into said fluid-containing portion;
said wall comprising a pliant, insulating material so that when said adhesive thermoplastic resin material is melted by the heat given off in the exothermic reaction said wall responds to elevated fluid pressure within said fluidcontaining portion by moving to reduce the volume of said adhesive-containing portion thereby forcing said adhesive thermoplastic resin material into the space between the sheet and said member; and an ignitor embedded in said bead for initiating an exothermic reaction within said reactant material;

said reactant material being present in such an amount that heat liberated during said exothermic reaction is sufficient to melt, but not totally destroy, said adhesive thermoplastic resin material.

23. A system as defined in claim 22 and further comprising:

a rim mounted on said outwardly extending flange, said rim being positioned so that, when said outwardly extending flange is adjacent said member, said rim is disposed therebetween; and spacer means on said rim to define a narrow adhesive receiving space between said member and said rim in communication with said adhesive-containing portion, so that said adhesive may be forced into said adhesive receiving space when fluid pressure in said fluid-containing portion is increased and said adhesive thermoplastic resin material is liquid.

24. A system as defined in claim 22 wherein said positioning means comprise a plurality of studs spaced around the perimeter of said sheet.

25. A system as defined in claim 22 wherein said positioning means comprises a plurality of studs positioned on said outwardly extending flange.

26. A system for patching a hole through a member comprising:

a patch structure including a sheet of patch material of sufficient area to cover the hole and a fluid-containment jacket mounted on said sheet in such a manner as to extend around the perimeter of the sheet, that has an outwardly extending flange and that defines a chamber;

positioning means for positioning said patch structure in fixed relation to said member;

spacer means for maintaining a narrow space between said member and said patch structure while said structure is held in position by said positioning means;

a first wall dividing said chamber into a fluid-containing portion and an adhesive-containing portion and a second wall dividing said adhesive-containing portion from said space, said jacket including an inlet for admitting a flow of fluid from a pressurized source into said fluid-containing portion;

an adhesive mass substantially filling said adhesive-containing portion;

said adhesive mass comprising a thermosetting adhesive material and at least one reactant material in intimate contact with said thermosetting adhesive material, said reactant material being so constituted and so distributed that when ignited it reacts exothermally in such a manner that said thermosetting adhesive material is caused to solidify;

said second wall being so constituted that when fluid under pressure is admitted to said fluid-containing portion and said reactant material is ignited said second wall is disrupted thereby admitting said fluent thermosetting reactant material to flow into said space;

said first wall comprising a pliant insulating material so that while said thermosetting adhesive material is fluent and said second wall is disrupted said first wall responds to elevated fluid pressure within said fluid-containing portion by moving the reduced volume of said adhesive-containing portion, thereby forcing said fluent thermosetting adhesive material into the space between said sheet and said member where it solidifies joining said sheet and said member; and an ignitor embedded in said adhesive mass for initiating an exothermic reaction within said reactant material;

said reactant material being present in such an amount that the heat liberated during said exothermic reaction is sufficient to set but not totally destroy said thermosetting adhesive material.

27. A system as defined in claim 26 and further comprising:

a rim mounted on said outwardly extending flange said rim being so positioned that when said outwardly extending flange is adjacent said member said rim is disposed therebetween; and spacer means on said rim to define a narrow adhesive-receiving space between said member and said rim, said adhesive-receiving space being in communication with said adhesivecontaining portion so that said adhesive may be forced into said adhesive-receiving space, when fluid pressure in said fluid-containing portion is increased and said thermosetting adhesive material is fluent.

28. A system as defined in claim 26 wherein said positioning means comprise a plurality of studs spaced around perimeter of said sheet.

29. A system as defined in claim 26 wherein said positioning means comprise a plurality of studs positioned on said outwardly extending flange.

* * * * *